July 13, 1926.

H. B. RANSOM 1,592,504

MEANS FOR MANUFACTURING FILAMENTOUS BISCUIT

Filed April 12, 1924    8 Sheets-Sheet 1

Fig.1.

INVENTOR
*H. B. Ransom.*
BY
*E. W. Anderson*
ATTORNEY

July 13, 1926.

H. B. RANSOM 1,592,504

MEANS FOR MANUFACTURING FILAMENTOUS BISCUIT

Filed April 12, 1924

INVENTOR
H. B. Ransom
BY
ATTORNEYS

July 13, 1926.

H. B. RANSOM 1,592,504

MEANS FOR MANUFACTURING FILAMENTOUS BISCUIT

Filed April 12, 1924    8 Sheets-Sheet 6

Fig.6.

INVENTOR
H. B. Ransom
BY
E. W. Anderson
ATTORNEYS

Patented July 13, 1926.

1,592,504

UNITED STATES PATENT OFFICE.

HAROLD B. RANSOM, OF NIAGARA FALLS, NEW YORK, ASSIGNOR TO THE SHREDDED WHEAT COMPANY, OF NIAGARA FALLS, NEW YORK, A CORPORATION OF NEW YORK.

MEANS FOR MANUFACTURING FILAMENTOUS BISCUIT.

Application filed April 12, 1924. Serial No. 706,036.

The invention has relation to machines for manufacturing cereal biscuit, and particularly filamentous cereal biscuit or crackers, having for an object the provision of certain improvements upon the disclosure of the Patent No. 797,604, dated August 22, 1905, in order to render the operation more reliable in properly baking and browning all of the biscuit and to render more reliable and to simplify the removal of the baked biscuit, whereby it will not be necessary to stop the operation of the machine to any extent for repairs upon the oven or for other reason, and the machine will be more continuously operative, and to eliminate improperly cooked and browned biscuit and the necessity for separating the same from the well baked biscuit.

The invention consists in the novel construction and combinations of parts, as set forth in the appended claims.

In the accompanying drawings illustrating an embodiment of the invention, the disclosure of the said patent and of the Patent No. 678,625 dated July 16, 1901, is made a part of the present disclosure where needed, for instance for the means for depositing the cereal layer, for dividing the same transversely, for depositing the green biscuit upon the oven conveyor, and for any other features not stated herein.

Instead of forming the links of the oven chains or conveyors to include therein the electric heating units, the present oven of which 1 designates the supporting framework and 2, the oven walls, is provided with electric heating units or elements 3, which are disposed within the oven chamber in suitable number and arrangement to properly heat the same, with some excess, so that in case of burning out of an element or elements as may occur in practice, the oven will still be sufficiently and properly heated. These electric heating units or elements are readily replaceable without appreciable loss of time.

The oven is preferably provided with a central horizontal partition 4 of non-conducting nature, and the electric heating elements are in horizontal series adjacent each stretch of the oven chains or conveyors and above and below each stretch, the inner and outer oven conveyors including respectively links 5 and 6 pivotally connected at 5' and 6', and each link having a hollow transverse head 7, open at the outer side at 8 and at the inner side thereof having the baking irons 9, the body of said irons being perforated at 10, said perforations communicating at the outer side with the cavity of said head and at the inner side opening into the molding face of the baking iron.

Figures 8, 9:
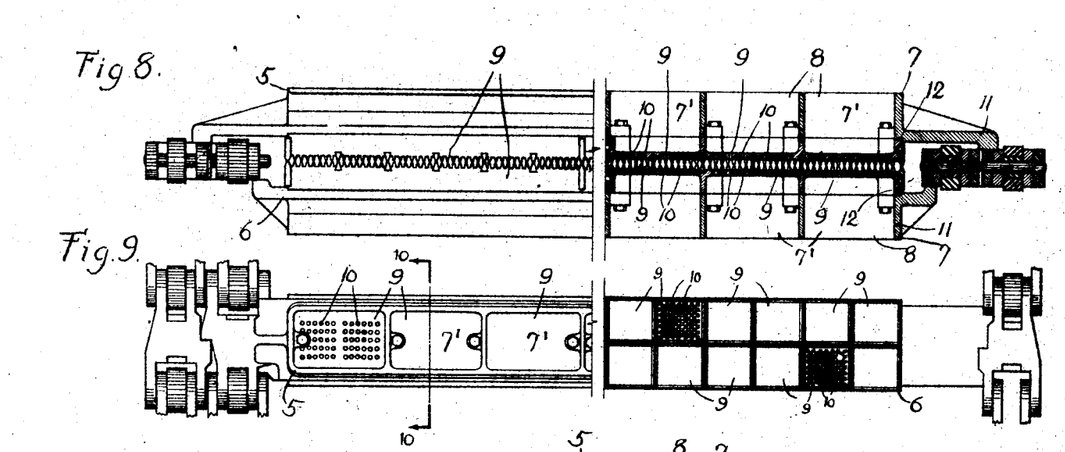
Figure 8 is a detail combined side view and longitudinal section of a pair of opposed links of the oven conveyors.
Figure 9 is a detail combined plan view of the same.
Figure 10:
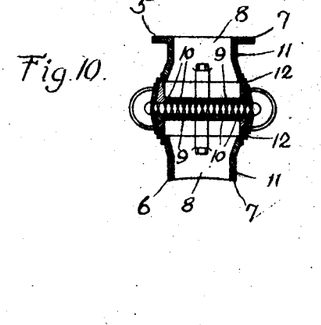
Figure 10 is a section on the line 10—10, Figure 9.

The links of the oven conveyors are each made with upper and lower castings 11 and 12, secured together by screws or bolts 13, and the lower or inner of said castings has secured across the opening or cavity thereof the aforesaid baking irons, each baking iron being adapted to mold one face of the biscuit or cracker and to divide the biscuit from each other substantially as disclosed in said patent.

The perforations 10 of the baking irons serve to more readily admit the heat of the oven to the biscuit being baked, which is important in view of the fact that the baking irons entirely inclose the biscuit and have considerable thickness. The result is that the oven is of added efficiency, the biscuit being more readily baked.

The removal of the baked biscuit from the baking irons of the outer chain or conveyor 6 is accomplished by air blast or fluid pressure directed through an upper horizontal series of vertically disposed pipes 14, communicating at their lower ends respectively with perforations 15' of a transverse horizontal head 15, with the lower face 16 of which the upper faces of the hollow heads 7 of the links of said conveyor are adapted to move in close proximity, whereby the air blast is directed through the aforesaid perforations 10 of the baking irons.

The removal of the baked biscuit from the baking irons of the inner chain or conveyor 5 is similarly accomplished by air blast or fluid pressure directed through a lower horizontal series of pipes 17, communicating at their inner ends respectively with perforations 18' of a horizontal transverse head 18, with the inner face 19 of which the outer faces of the hollow heads 7 of the links of the conveyor 5 are adapted to move in close proximity, whereby the air blast is directed through the perforations 10 of the baking irons.

The heads 7 of the links of both conveyors 5 and 6 are provided with separate compartments 7', and the pipes 14 and 17 communicate through the transverse heads 15 and 18 and the perforations 15' and 18' thereof respectively with said compartments, whereby the blast is more directly delivered to the biscuit to be removed.

In this way, the biscuit or crackers are more effectually removed from the baking irons, to which they have a considerable tendency to adhere.

Figure 1:
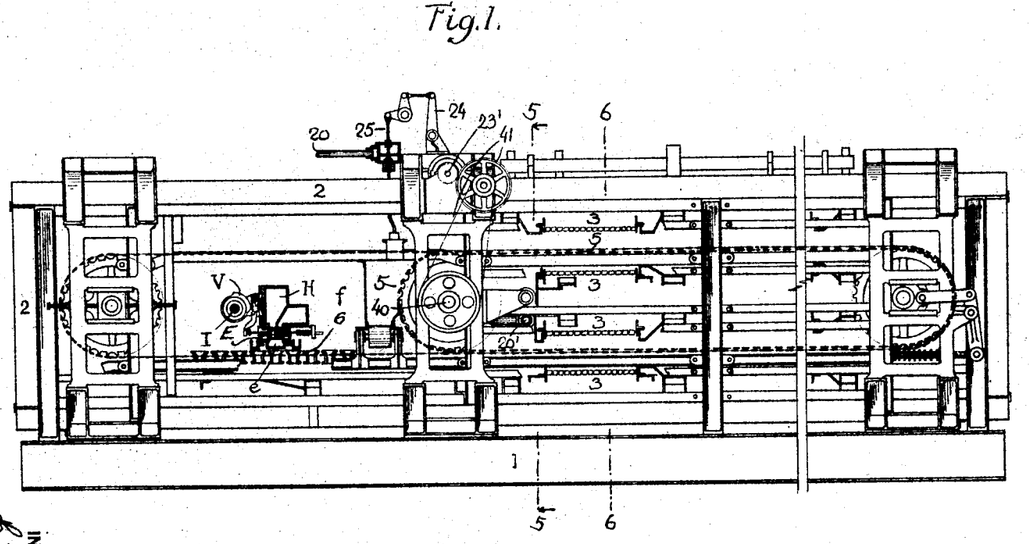
Figure 1 is a side view of the invention, partly broken away, and partly in section.
Figure 2:
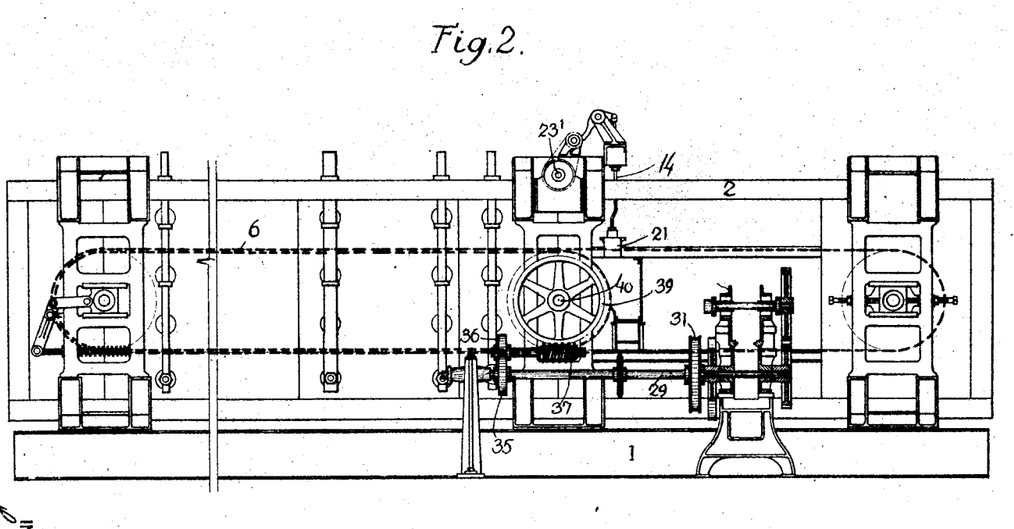
Figure 2 is a side view of the invention, taken from the opposite side, with parts in section, the section being taken on the line 2—2, Figure 3.
Figure 3:
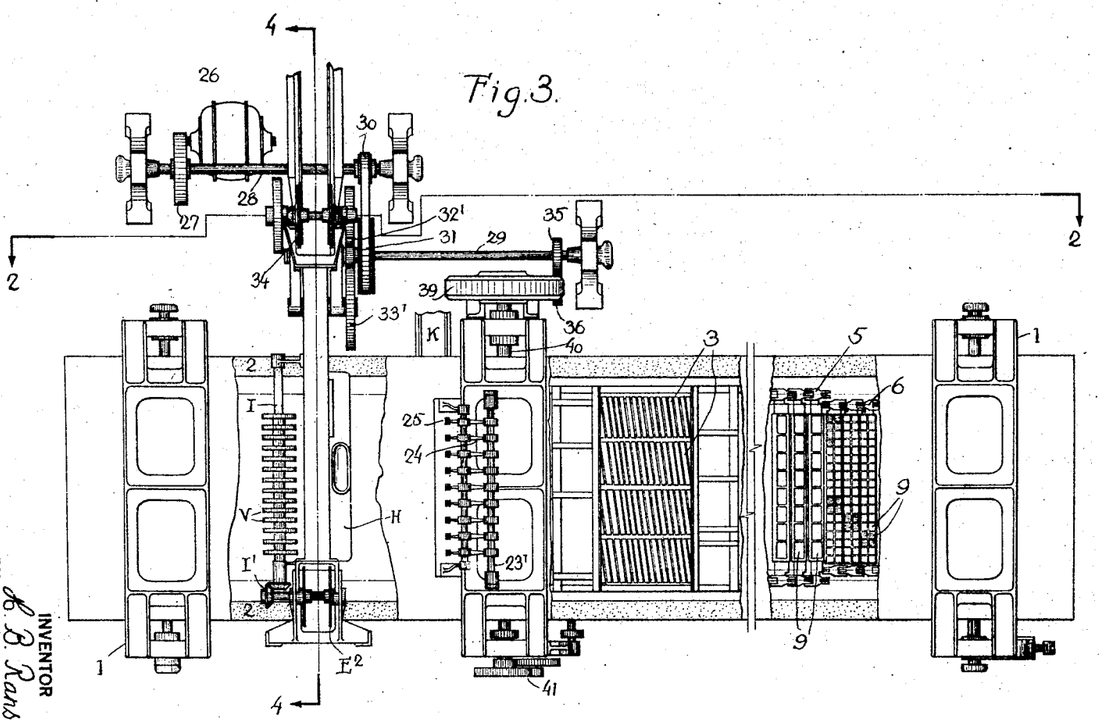
Figure 3 is a plan view of the invention, partly broken away.
Figure 4:
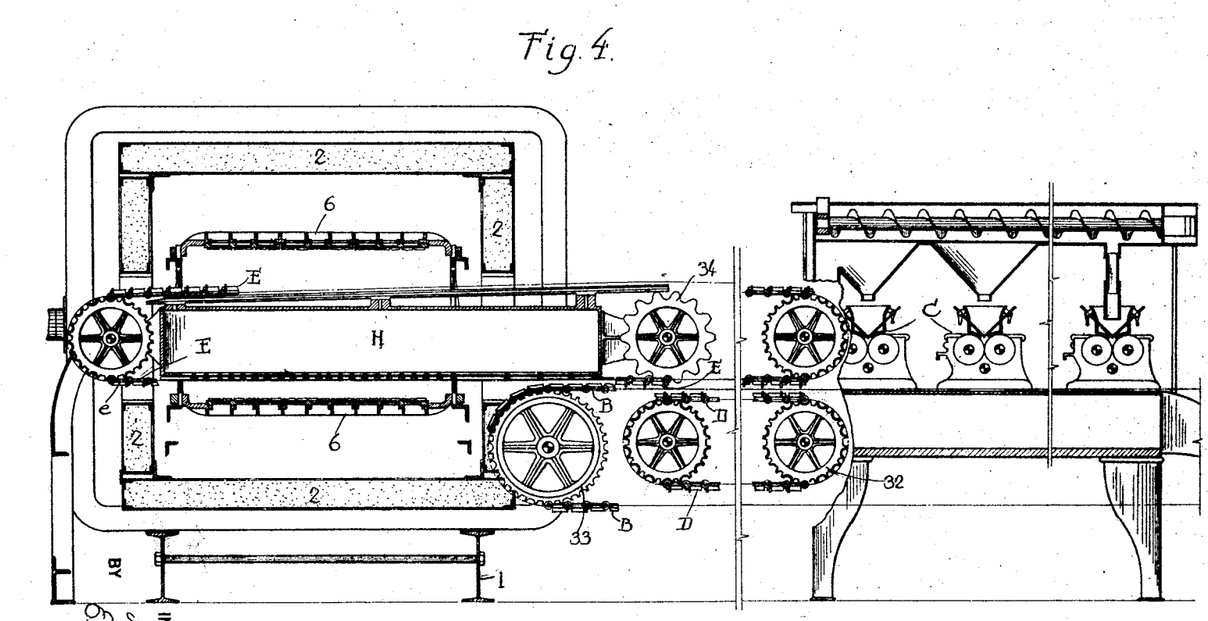
Figure 4 is a section on the line 4—4, Figure 3, partly broken away.
Figure 5:
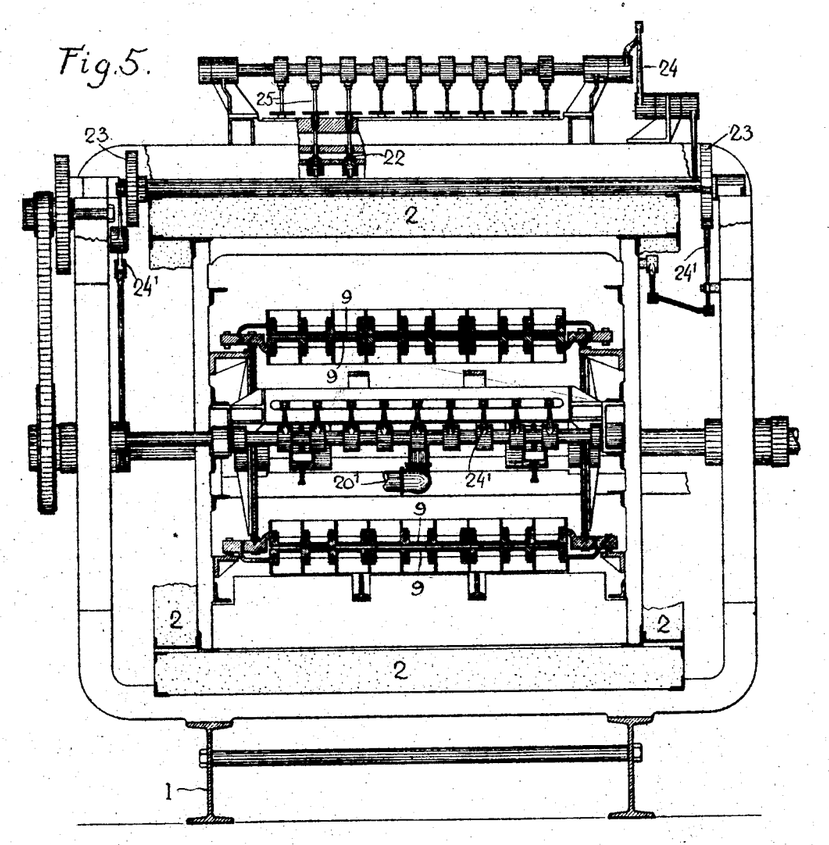
Figure 5 is a transverse vertical section of the oven, on the line 5—5, Figure 1.
Figure 6:
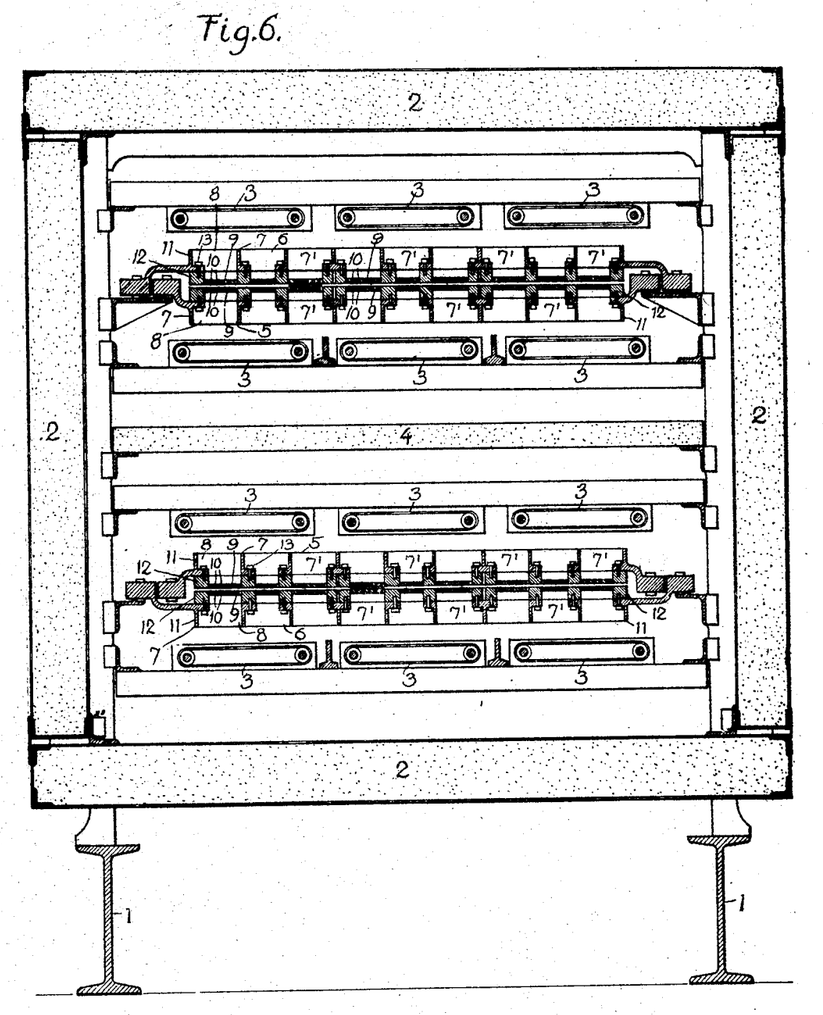
Figure 6 is a similar view taken on the line 6—6, Figure 1.
Figure 7:
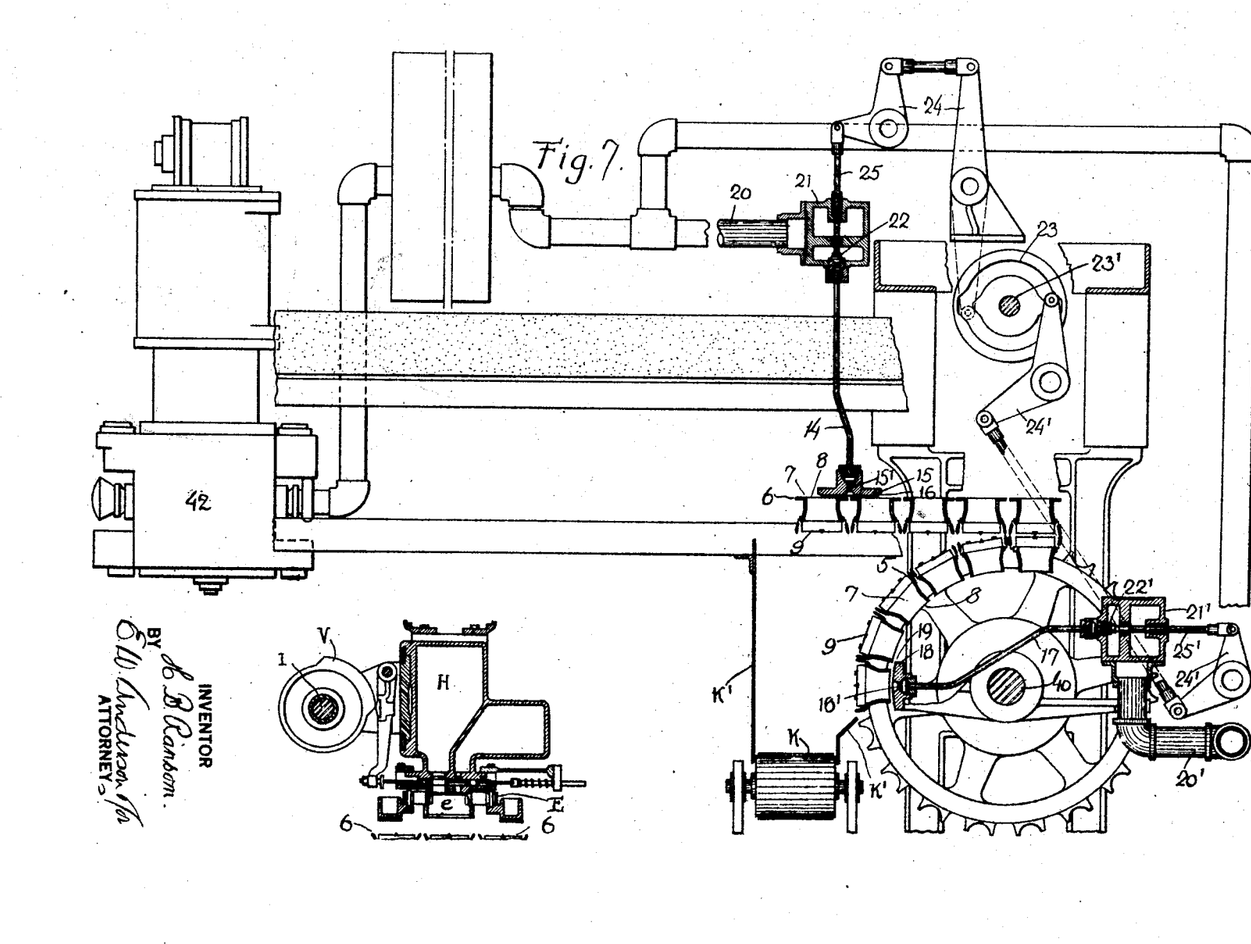
Figure 7 is a fragmentary vertical longitudinal section of the invention showing the biscuit depositing means and the biscuit removal means.

In the utilization of the fluid pressure or air blast, in the structure shown, means are provided for periodically directing the blast through said pipes and including a suitable source of air or other fluid pressure, shown at 42 in Figure 7 of the drawings, delivering through pipes 20, 20' to cylinders 21, 21', having valves 22, 22', controlling the delivery of the blast to the aforesaid pipes 14 and 17, said valves being periodically opened and closed by cams 23, operating levers 24, 24', the latter operating the valve rods 25, 25'.

It is obvious that if desired the air blast or fluid pressure may be continuously directed through the pipes 14 and 17, rather than periodically as stated.

It is also obvious that biscuit removal means other than fluid pressure may operate through the perforations 10 of the baking irons.

In the delivery of the cereal material to the oven conveyors, the reducing machines C deposit the filamentous cereal upon the endless conveyor B, said material being divided transversely into biscuit by the upper and lower endless cutter chains E and D. The oven is provided with an opening $f$ for the passage of the biscuit depositing end portion of the endless chain E, the links $e$ of which are adapted to work in conjunction with pneumatic means for upholding the biscuit in the links of the lower stretch of said chain, after the biscuit have been carried by the conveyor B to the limit in one direction, the links of the chain E thereafter acting as a part of the conveyor for the biscuit, and the release of the vacuum or exhaust causing release of the biscuit, which fall through force of gravity and are deposited from the links $e$ upon the links 6 of the outer oven conveyor.

The pneumatic or suction chamber H is in communication with the links $e$ of the endless chain conveyor E, the suction being intermittently applied and released to uphold and release the biscuit as stated. The shaft I carrying the cams V, is operated from the shaft of the sprocket gear $E^2$ of the chain E by bevel gearing I'.

The biscuit being removed from the oven conveyors as stated are received upon a laterally moving conveyor K, guarded at the sides by walls K'.

Power is transmitted from motor 26, through gears 27, driving shaft 28, the latter being geared to shaft 29, through chain drive 30 and 31. Sprocket gears 32 and 33 are driven from shaft 29, through gears 32' and 33', thereby driving the endless chain conveyor E by sprocket gear 34. Gear 35, upon shaft 29, drives gear 36, the latter being fast to a short shaft upon which the worm 37 is also fast, thereby transmitting power through worm wheel 39 and driving the shaft 40, upon which are the main driving sprockets of the oven conveyors. The shaft 23' of the cams 23 is driven by gearing 41 from the shaft 40.

I claim:—

1. In a machine for manufacturing biscuit, an oven, means for heating the oven chamber, oven conveyor means adapted to mold the green biscuit deposited thereon and having passages opening into the molding faces of the conveyor means and adapted to admit the heat of the oven thereto, and means operating through said passages for removing the baked biscuit.

2. In a machine for manufacturing filamentous biscuit, an oven, means for heating the oven chamber, two cooperating oven conveyors, means for depositing the green biscuit upon one of said conveyors, the two conveyors having links adapted to mold the biscuit and passages opening into the molding faces of said links and adapted to admit the heat of the oven thereto.

3. In a machine for manufacturing filamentous biscuit, an oven, means for heating the oven chamber, two cooperating oven conveyors, means for depositing the green biscuit upon one of said conveyors, the two conveyors having links adapted to mold the biscuit and having passages opening into the molding faces of said links and adapted to admit the heat of the oven thereto, and means operating through the passages of both conveyors for removing the baked biscuit.

4. In a machine for manufacturing filamentous biscuit, an oven, means for heating the oven chamber, oven conveyor means adapted to mold the green biscuit deposited thereon and having passages opening into the molding faces of the conveyors and adapted to admit the heat of the oven thereto, and means adapted to convey a fluid pressure blast and operating through said passages for removing the baked biscuit.

5. In a machine for manufacturing filamentous biscuit, an oven, means for heating the oven chamber, oven conveyor means adapted to mold the green biscuit deposited thereon and having passages opening into the molding faces of the conveyors and adapted to admit the heat of the oven thereto, and means operating periodically and adapted to convey a fluid pressure blast through said passages for removing the baked biscuit.

6. In a machine for manufacturing filamentous biscuit, an oven, means for heating the oven chamber, two cooperating oven conveyors, means for depositing the green biscuit upon one of said conveyors, the two conveyors having links adapted to mold the green biscuit and having passages opening into the molding faces of said links and adapted to admit the heat of the oven thereto, and means adapted to convey a fluid pressure blast and operating through the passages of the links of both conveyors for removing of the baked biscuit.

7. In a machine for manufacturing filamentous biscuit, an oven, means for heating the oven chamber, two cooperating oven conveyors having links adapted to mold the green biscuit deposited upon one of said conveyors and passages opening into the molding faces of the links and adapted to admit the heat of the oven thereto, said links having hollow heads communicating with said passages, and means adapted to convey fluid pressure and communicating with said heads for removing the baked biscuit.

8. In a machine for manufacturing filamentous biscuit, an oven, means for heating the oven chamber, two cooperating oven conveyors having links adapted to mold the green biscuit deposited upon one of said conveyors and having passages opening into the molding faces of said links and adapted to admit the heat of the oven thereto, said links having hollow heads communicating with said passages, and means adapted to convey fluid pressure and having perforated transverse heads with which the hollow heads of said links are adapted to move in close proximity and pipes communicating with the perforations of said transverse heads for removing the baked biscuit.

9. In a machine for manufacturing filamentous biscuit, an oven, means for heating the oven chamber, two cooperating oven conveyors having links adapted to mold the green biscuit deposited upon one of said conveyors and having passages opening into the molding faces of said links and adapted to admit the heat of the oven thereto, said links having hollow heads communicating with said passages, and means adapted to convey fluid pressure and having transverse perforated heads with which the hollow heads of said links are adapted to move in close proximity and pipes communicating at one end with the perforations of said transverse heads, fluid pressure cylinders having a source of pressure supply and communicating with the other ends of said pipes, valves controlling said communication and means for periodically opening and closing said valves.

In testimony whereof I affix my signature.

H. B. RANSOM.